Figure 1:
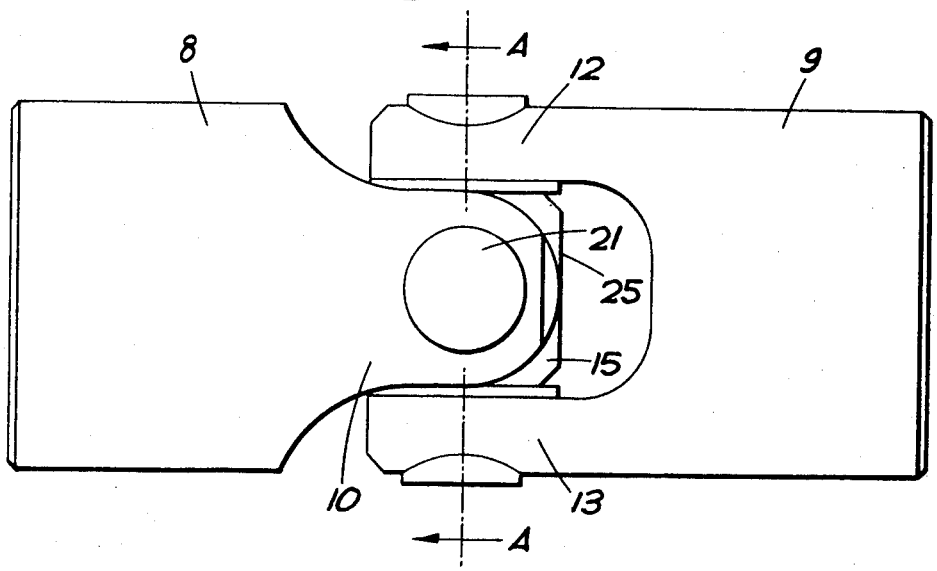

United States Patent [19]

Shotter

[11] 3,740,969

[45] June 26, 1973

[54] UNIVERSAL JOINTS
[75] Inventor: Brian Alfred Shotter, Romford, England
[73] Assignee: The Motor Gear & Engineering Company Limited, Romford, England
[22] Filed: May 7, 1971
[21] Appl. No.: 141,343

[52] U.S. Cl. ............................................... 64/17 A
[51] Int. Cl. ............................................ F16d 3/33
[58] Field of Search ......................... 64/17 A, 17 R

[56] References Cited
UNITED STATES PATENTS
3,589,143  6/1971  Batt ................................... 64/17 A
3,446,507  5/1969  Ulics .................................. 64/17 A
2,141,264  12/1938  Cutting ............................. 64/17 A Primary Examiner—Edward G. Favors
Attorney—Mawhinney & Mawhinney

[57] ABSTRACT

The drawing discloses a universal joint comprising two forks each providing two spaced arms, a center block having four locating members projecting therefrom in the form of a cross, the two arms of one fork having bores containing bearings in which one pair of the locating members are rotatably mounted and the two arms of the other fork having bores containing bearings in which the other locating members are rotatably mounted, each locating member having a recess on its outer end for holding a supply of lubricant and there being a cap fitted over and spaced from the outer end of each locating member to direct lubricant from the recess to the bearing in which the locating member is mounted.

12 Claims, 3 Drawing Figures

PATENTED JUN 26 1973　　　　3,740,969

SHEET 1 OF 2

INVENTOR
BRIAN ALFRED SHOTTER
BY
ATTYS

PATENTED JUN 26 1973

3,740,969

SHEET 2 OF 2

INVENTOR
BRIAN ALFRED SHOTTER
BY Mawhinney & Mawhinney
ATTYS

UNIVERSAL JOINTS

The invention relates to universal joints.

The invention provides a universal joint comprising two forks each providing two spaced arms, a center block having four locating members projecting therefrom in the form of a cross, the two arms of one fork having bores containing bearings in which one pair of the locating members are rotatably mounted and the two arms of the other fork having bores containing bearings in which the other locating members are rotatably mounted, each locating member having a recess on its outer end for holding a supply of lubricant and there being a cap fitted over and spaced from the outer end of each locating member to direct lubricant from the recess to the bearing in which the locating member is mounted.

Each locating member may project from a flat bearing surface on the center block and a thrust washer may be located between each bearing surface around the locating member and the adjacent arm of a fork.

The thrust washer may be bowed in cross-section and the outer edge of the washer bears resiliently against said flat surface of the center block.

Each locating member may be mounted in a hole in the center block, in which hole said member is a force fit.

Alternatively, each locating member may be mounted in a hole in the center block and is retained in the hole by a pin, screw, or like fixing member passing into the center block and into the locating member.

The two locating members about which the two arms of one fork pivot respectively may be provided by opposite end portions of a cylindrical spindle which passes through the center block and projects at each side of the block, and each of the two locating members about which the two arms of the other fork pivot may be provided by end portions of two cylindrical spigots of the same diameter as the spindle which spigots pass into the center block and engage in a circumferential recess in said spindle.

The spigots may be a force fit in the center block.

Alternatively the spigots may be retained in the center block by pins, screws or like fixing members.

The bearings between the locating members and the bores in the fork arms may be needle roller bearings.

Said cap may have a dependent skirt which projects through the bore of the associated fork arm and engages the center block with the inner surface of the skirt engaging the bearing.

Said inner surface of the skirt may provide the outer raceway of the needle roller bearings.

Each cap may protrude radially outside the outer periphery of its associated fork arm.

Each of said two forks may be constructed by providing a cross slot in one end of a shaft.

The center block may be substantially cubic.

Figure 2:
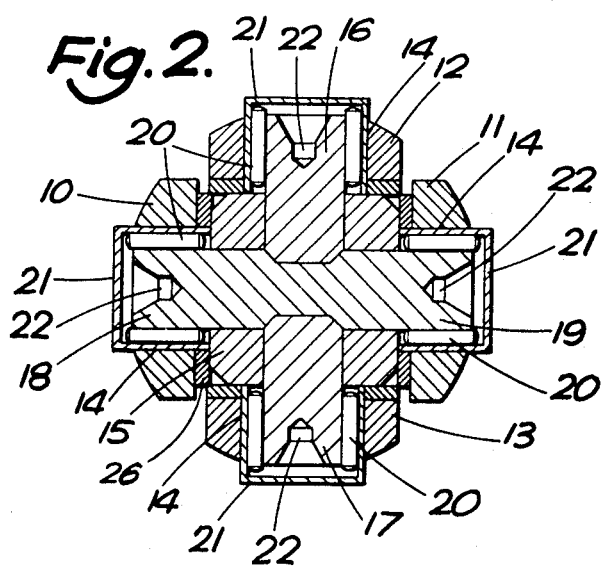
Figure 3:
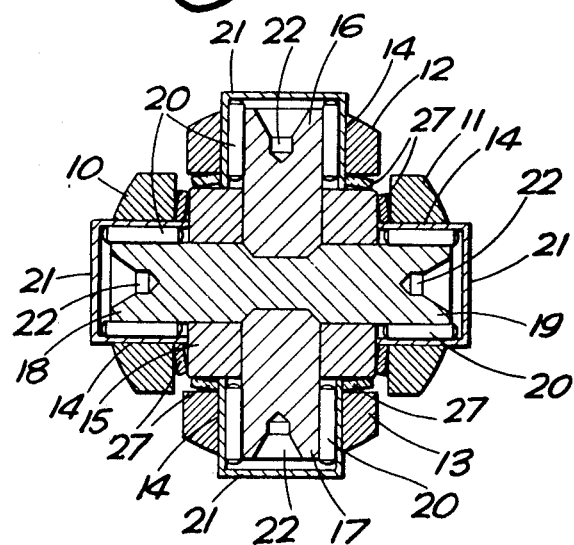

By way of example, two specific embodiments of the invention will now be described, with reference to the accompanying drawings, in which:

FIG. 1 is a view of a joint embodying the invention,
FIG. 2 is a section along A—A in FIG. 1, and
FIG. 3 is a section through a second embodiment of the invention.

Referring to FIGS. 1 and 2, one fork, having arms 10,11 is provided by a solid cylindrical shaft 8 chamfered at one end and having a cross slot. A second fork, having arms 12,13 is provided by a solid cylindrical shaft 9 also chamfered at one end and having a cross slot.

Each arm has a hole 14 therethrough. The center block 15 is substantially cubic and four locating pins 16,17,18,19 are mounted in the block 15 with the axes of the pins forming the configuration of a cross. Pins 18 and 19 are formed integrally in one piece as a spindle and the block is assembled by first inserting the spindle into a through hole in the block 15, and then inserting pins 16 and 17, which lock pins 18 and 19 into position by virtue of their tapered ends engaging a recess in the center of the member comprising pins 18 and 19. Pins 16 and 17 may be secured by pins, screws or like fixing members for example by Allen screws inserted through face 25 of the block (FIG. 1). Alternatively pins 16 and 17 may be a force fit in the block 15.

The forks are arranged to pivot about the pins, and needle bearings 20 are inserted around each pin between the sides of the pin and the sides of the associated hole 14.

To retain the bearings 20 and to prevent loss of lubrication, the joint is provided with four thin-walled caps 21, one of which fits over each pin and its associated bearings as shown. The caps may be formed by drawing.

Each form arm has an associated thrust washer 26 which is mounted around one of the pins 18. The flat formed on the inside of the arm and the opposed flat or bearing surface of the block 15 bear against and are in sliding contact with, opposite faces of the washer 26. This reduces any wear, since the washers may be constructed of different material to that of the arms and the block.

In order to increase the lubrication available in the joint, recesses 22 are provided in the free end of each pin. These recesses may then act as reservoirs for lubricant. It has been found that the provision of recesses as shown has little or no detrimental effect on the strength of the joint, the pins being otherwise of solid (i.e. not hollow) construction, but may give appreciable improvement in running life.

The recesses may have the form of a countersunk hole as shown, but they may of course take other forms.

The embodiment shown in FIG. 3 is similar to that shown in FIG. 2 except that only the pointed corners of the cubic center member 15 are chamfered and that thrust washers 27 each have a bowed cross-section with the outer edge of the washers bearing resiliently against respective flats of the hub. It will be seen that each cap 21 protrudes beyond the outer periphery of its respective fork.

The fork arms are therefore closer together than in joints in which the fork arms completely enclose the caps so the center distance of two joints operated side by side can be reduced by overlapping the paths of the caps on the two joints and synchronizing the rotation of the joints so that their respective caps do not engage.

Many modifications are possible without departing from the scope of the invention, for example, two separate pins may be mounted in aligned holes in opposite faces of the body part in place of the integrally formed pins 18 and 19. Each of the two separate pins may be retained in its hole by a pin, screw or like fixing member passing into the center block and the pin. Alternatively, each of the two separate pins may be a force fit in its hole.

I claim:

1. A universal joint comprising two forks each providing two spaced arms, each pair of arms having aligned bores, bearing located in the bores, a center block having four locating members projecting therefrom in the form of a cross and four flat bearing surfaces around the locating members respectively, each pair of aligned locating members being rotatably mounted in the bearings in a respective pair of said aligned bores and each locating member having a blind recess provided in its outer end for holding a supply of lubricant, a cap fitted over each locating member, the cap having an end wall located opposite an outer end of the respective locating member, a passage being provided between the end wall and said outer end of the locating member to permit lubricant to pass from said recess to the bearing, the cap further having an upstanding annular wall which projects through the bore of the corresponding fork arm and engages the center block, the bearing associated with that fork arm being located in the inner surface of the annular wall, and an annular thrust washer located between and in engagement with each bearing surface and the inner surface of the adjacent fork arm.

2. A universal joint as claimed in claim 1 wherein the thrust washer is bowed in cross-section and the outer edge of the washer bears resiliently against said flat surface of the center block.

3. A universal joint as claimed in claim 1 wherein each locating member is mounted in a hole in the center block, in which hole said member is a force fit.

4. A universal joint as claimed in claim 1 wherein each locating member is mounted in a hole in the center block and is retained in the hole by a pin, screw, or like fixing member passing into the center block and into the locating member.

5. A universal joint as claimed in claim 1 wherein the two locating members about which the two arms of one fork pivot respectively are provided by opposite end portions of a cylindrical spindle which passes through the center block and projects at each side of the block, and each of the two locating members about which the two arms of the other fork pivot is provided by end portions of two cylindrical spigots of the same diameter as the spindle which spigots pass into the center block and engage in a circumferential recess in said spindle.

6. A universal joint as claimed in claim 5 wherein the spigots are a force fit in the center block.

7. A universal joint as claimed in claim 5 wherein the spigots are retained in the center block by pins, screws or like fixing members.

8. A universal joint as claimed in claim 1 wherein the bearings between the locating members and the bores in the fork arms are needle roller bearings.

9. A universal joint as claimed in claim 8 the inner surface of the annular wall of the cap provides the outer raceway of the needle roller bearings.

10. A universal joint as claimed in claim 1 wherein each cap protrudes radially outside the outer periphery of its associated fork arm.

11. A universal joint as claimed in claim 1 wherein each of said two forks is constructed by providing a cross slot in one end of a shaft.

12. A universal joint as claimed in claim 1 wherein the center block is substantially cubic.

* * * * *